United States Patent
Yamada et al.

(10) Patent No.: US 9,875,433 B2
(45) Date of Patent: Jan. 23, 2018

(54) LINKAGE SYSTEM AND LINKAGE METHOD FOR IMAGE PROCESSING, PORTABLE TERMINAL DEVICE, AND IMAGE PROCESSING LINKAGE PROGRAM

(71) Applicant: Konica Minolta, Inc., Tokyo (JP)

(72) Inventors: Kei Yamada, Hyogo (JP); Hirotomo Ishii, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/685,124

(22) Filed: Apr. 13, 2015

(65) Prior Publication Data

US 2015/0293731 A1 Oct. 15, 2015

(30) Foreign Application Priority Data

Apr. 15, 2014 (JP) ................................ 2014-084070

(51) Int. Cl.
*G06F 3/12* (2006.01)
*G06K 15/00* (2006.01)
*H04N 1/00* (2006.01)
*G06F 9/44* (2006.01)

(52) U.S. Cl.
CPC ......... *G06K 15/007* (2013.01); *G06F 9/4445* (2013.01); *H04N 1/0035* (2013.01); *G06F 3/1205* (2013.01); *G06F 3/1253* (2013.01); *G06F 3/1292* (2013.01)

(58) Field of Classification Search
CPC .... G06F 9/4443; G06F 3/1253; G06F 3/1292; G06F 3/1205; H04N 1/0035; G06K 15/007

USPC ........................................................ 358/1.15
See application file for complete search history.

(56) References Cited

U.S. PATENT DOCUMENTS

| | | | | |
|---|---|---|---|---|
| 2011/0029891 A1* | 2/2011 | Kim | ................... | H04M 1/72561 715/752 |
| 2012/0042102 A1* | 2/2012 | Chung | ................ | H04M 1/7253 710/33 |
| 2013/0076764 A1* | 3/2013 | Yada | ................... | H04L 12/1827 345/520 |

(Continued)

FOREIGN PATENT DOCUMENTS

| JP | 2000-020474 A | 1/2000 |
|---|---|---|
| JP | 2002-281195 A | 9/2002 |

(Continued)

OTHER PUBLICATIONS

Office Action issued in corresponding Japanese Application No. 2014-084070 dated Apr. 5, 2016, and English translation thereof (7 pages).

*Primary Examiner* — Neil R McLean
(74) *Attorney, Agent, or Firm* — Osha Liang LLP

(57) ABSTRACT

An image processing linkage system includes: an image processing apparatus and a portable terminal device connectable with each other, wherein the image processing apparatus includes a display unit, and a transmitting unit, the portable terminal device includes a display unit, a receiving unit, a display control unit, an operation information converting unit, and a transmitting unit, and the image processing apparatus receives the operation information transmitted from the portable terminal device, and executes a process corresponding to the operation information.

21 Claims, 13 Drawing Sheets

(56) References Cited

U.S. PATENT DOCUMENTS

| | | | | |
|---|---|---|---|---|
| 2013/0100497 A1* | 4/2013 | Amiya | ............... | G06F 3/1454 |
| | | | | 358/1.15 |
| 2014/0320918 A1* | 10/2014 | Yamamoto | ............ | G06F 3/1292 |
| | | | | 358/1.15 |
| 2015/0082241 A1* | 3/2015 | Kang | ................... | G06F 3/1454 |
| | | | | 715/803 |

FOREIGN PATENT DOCUMENTS

| JP | 2009/245095 A | 10/2009 |
|---|---|---|
| JP | 2014/006668 A | 1/2014 |

\* cited by examiner

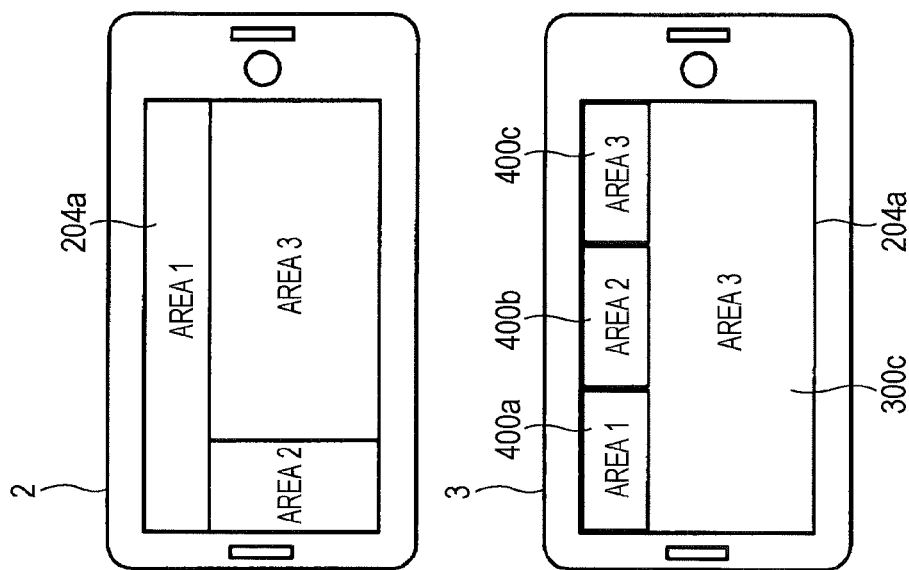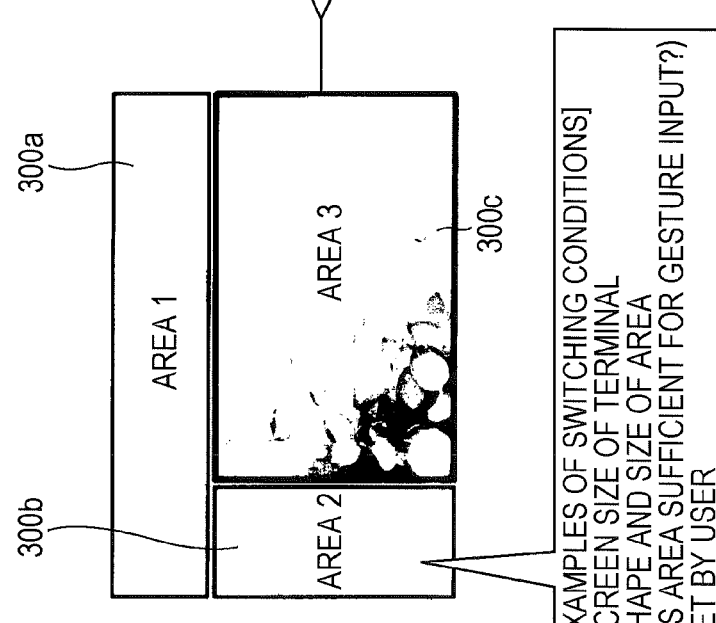
FIG. 7

LINKAGE SYSTEM AND LINKAGE METHOD FOR IMAGE PROCESSING, PORTABLE TERMINAL DEVICE, AND IMAGE PROCESSING LINKAGE PROGRAM

CROSS-REFERENCE TO RELATED APPLICATIONS

The entire disclosure of Japanese Patent Application No. 2014-084070 filed on Apr. 15, 2014 including description, claims, drawings, and abstract are incorporated herein by reference in its entirety.

TECHNICAL FIELD

The present invention relates to linkage system and linkage method for image processing, a portable terminal device, and an image processing linkage program, provided with a smartphone, a tablet device, or other types of portable terminal device connectable via a wireless communication or the like to an image processing apparatus such as an MFP (Multifunction Peripheral) functioning as a digital multifunction apparatus.

BACKGROUND ART

A portable terminal device in recent years, such as a smartphone and a tablet device, stores electronized documents so that the stored documents can be read and edited at any time and any place. In addition, the portable terminal device transmits files edited or processed in other ways on the portable terminal device side to an image processing apparatus such as an MFP, so that the files can be printed, stored, or processed in other ways on the image processing apparatus side. Furthermore, the image processing apparatus reads image data and the like from documents by using a scanner unit of the image processing apparatus, and transmits files containing the image data and the like to the portable terminal device, so that the files can be edited or processed in other ways on the portable terminal side.

However, the portable terminal device and the image processing apparatus require independent operation for each for practicing these functions. In this case, each operation becomes complicated operation.

For overcoming this problem, there has been proposed in more recent years a linkage system between an image processing apparatus and a portable terminal device. According to this system, an operation screen operated for performing functions of the image processing apparatus is displayed on a display unit of the portable terminal device as a remote screen, so that linkage operation of the image processing apparatus can be conducted on the portable terminal device side (for example, see JP 2002-281195 A). According to this linkage system, the remote screen corresponding to the screen of the image processing apparatus and displayed on the display unit of the portable terminal device is created based on screen data transmitted from the image processing apparatus.

More specifically, the portable terminal device creates information indicating that certain operation has been input, and transmits this information to the image processing apparatus. The image processing apparatus having received this information creates next screen data based on the received information, and transmits the created screen data to the portable terminal device. The portable terminal device updates a remote screen based on the received screen data, and displays the updated screen.

An operation panel of a recent image processing apparatus receives input of operation from a user based on gesture operation input to a display screen of the operation panel. A large proportion of the gesture operation is constituted by complicated operation such as multiple touch operation performed by using a plurality of fingers, flick, pinch and others, as well as ordinary button operation. Under this tendency, the screen size of the operation panel is increasing, and the number of parts such as buttons displayed on the screen is also rising.

On the other hand, a typical portable terminal device similarly receives input of operation from a user based on gesture operation input to a display screen of the portable terminal device. However, the screen size of the portable terminal device is generally smaller than the screen size of the image processing apparatus.

When the screen size of the portable terminal device is smaller than the screen size of the image processing apparatus, the operation screen of the image processing apparatus is adjusted to a size corresponding to the screen size of the portable terminal device, and displayed in the reduced size on the portable terminal device. In this case, input of gesture operation is difficult for the user, causing low operability. Accordingly, such a technology has been demanded which allows easy input of gesture operation from the user to the operation screen of the image processing apparatus on the portable terminal device side even when the screen of the portable terminal device is small.

SUMMARY OF THE INVENTION

A linkage system and linkage method for image processing, and a portable terminal device, in accordance with one or more embodiments, allow users to improve operability by increasing the easiness in inputting gesture operation to a display unit of the portable terminal device through a remote screen displayed on the display unit of the portable terminal device and showing an operation screen of an image processing apparatus, even when a display screen of the portable terminal device is small. An image processing linkage program under which a computer of the portable terminal device in accordance with one or more embodiments executes processing to allow users to improve operability.

For example, one or more embodiments of the present invention may be realized as follows.

(1) In one aspect, an image processing linkage system according to one or more embodiments of the present invention comprises: an image processing apparatus and a portable terminal device connectable with each other, wherein the image processing apparatus includes a display unit that receives input of gesture operation, and a transmitting unit that transmits, to the portable terminal device, screen data constituting an operation screen displayed on the display unit, and information on one or a plurality of gesture input areas provided in correspondence with the screen data and receiving input of gesture operation, the portable terminal device includes a display unit that receives input of gesture operation, a receiving unit that receives the screen data and the information on the gesture input area or areas, a display control unit that displays the operation screen of the image processing apparatus as an area selection screen shown in such a manner that a user can select any one of the gesture input areas through the area selection screen based on the screen data and the information on the gesture input area or areas received from the receiving unit, and displays the corresponding gesture input area in adjusted size and/or display position on the display unit when the user selects any one of the gesture input areas through the displayed area selection screen, an operation information converting unit that converts operation information corresponding to gesture operation into operation information prior to adjustment of the size and/or the display position when the gesture operation is input to the gesture input area displayed on the display unit, and a transmitting unit that transmits the converted operation information to the image processing apparatus, and the image processing apparatus receives the operation information transmitted from the portable terminal device, and executes a process corresponding to the operation information.

(2) According to one or more embodiments, the image processing apparatus and the portable terminal device may be connectable with each other via an information processing device that includes a display unit not receiving input of gesture operation, and the information processing device may receive the screen data and the information on the gesture input area or areas from the image processing apparatus and transfer the received screen data and information to the portable terminal device, and receive the operation information from the portable terminal device and transfer the received operation information to the image processing apparatus.

(3) According to one or more embodiments, the gesture operation may include at least either operation by a single touch or operation by a multiple touch.

(4) According to one or more embodiments, the information on the gesture input area or areas may contain information on gesture operation receivable by each of the gesture input areas, and the operation information converting unit of the portable terminal device may convert the operation information corresponding to the receivable gesture operation into operation information prior to adjustment of the size and/or the display position only when the receivable gesture operation is executed.

(5) According to one or more embodiments, the portable terminal device may set a range for receiving gesture input in excess of the corresponding gesture input area when the shape of the gesture input area is different from a screen shape of the display unit of the portable terminal device by a predetermined amount or larger.

(6) According to one or more embodiments, when a plurality of gesture input areas exists, the display control unit of the portable terminal device may switch a display mode of the area selection screen between a mode where all the gesture input areas are displayed on the same screen of the display unit, and a mode where a designated gesture input area is selectively displayed, based on conditions set beforehand.

(7) According to one or more embodiments, the operation screen of the image processing apparatus may be displayed on the display unit of the information processing device based on the screen data transmitted from the image processing apparatus.

(8) According to one or more embodiments, the gesture input area selected by the user on the portable terminal device side may be displayed on the display unit of the information processing device in an identifiable manner different from the other gesture input areas on the operation screen of the image processing apparatus.

(9) An image processing linkage method according to one or more embodiments of the present invention is executed by an image processing linkage system including an image processing apparatus and a portable terminal device connectable with each other, wherein the image processing apparatus executes a transmitting step that transmits, to the portable terminal device, screen data constituting an operation screen displayed on a display unit of the image processing apparatus and receiving input of gesture operation, and information on one or a plurality of gesture input areas on a screen as area or areas associated with the screen data and receiving input of gesture operation, and the portable terminal device executes a receiving step that receives the screen data and the information on the gesture input area or areas, a display control step that displays the operation screen of the image processing apparatus as an area selection screen shown in such a manner that a user can select any one of the gesture input areas through the area selection screen based on the screen data and the information on the gesture input area or areas received in the receiving step, and display the corresponding gesture input area in adjusted size and/or display position on a display unit of the potable terminal device when the user selects any one of the gesture input areas through the displayed area selection screen, an operation information converting step that converts operation information corresponding to the gesture operation into operation information of the screen prior to adjustment of the size and/or the display position when the gesture operation is input to the gesture input area displayed on the display unit of the portable terminal device, and a transmitting step that transmits the converted operation information to the image processing apparatus, and the image processing apparatus receives the operation information transmitted from the portable terminal device, and executes a process corresponding to the operation information.

(10) A portable terminal device according to one or more embodiments of the present invention comprises: a connecting unit that connects with an image processing apparatus which displays an operation screen receiving input of gesture operation; a display unit that receives input of the gesture operation, a receiving unit that receives screen data constituting an operation screen displayed on the image processing apparatus, and information on one or a plurality of gesture input areas provided in correspondence with the screen data and receiving input of the gesture operation; a display control unit that displays the operation screen of the image processing apparatus as an area selection screen shown in such a manner that a user can select any one of the gesture input areas through the area selection screen based on the screen data and the information on the gesture input area or areas received from the receiving unit, and displays the corresponding gesture input area in adjusted size and/or display position on the display unit when the user selects the any one of the gesture input areas through the displayed area selection screen; an operation information converting unit that converts operation information corresponding to the gesture operation into operation information prior to adjustment of the size and/or the display position when the gesture operation is input to the gesture input area displayed on the display unit; and a transmitting unit that transmits the converted operation information to the image processing apparatus.

(11) According to one or more embodiments, the portable terminal device may be connectable with the image processing apparatus via an information processing device that includes a display unit not receiving input of the gesture operation, and the receiving unit may receive the screen data and the information on the gesture input area or areas from the information processing device having received the screen data and the information on the gesture input area or areas from the image processing apparatus, and the transmitting unit may transmit the operation information to the information processing device.

(12) According to one or more embodiments, the gesture operation may include at least either operation by a single touch or operation by a multiple touch.

(13) According to one or more embodiments, the information on the gesture input area or areas may contain information on the gesture operation receivable by each of the gesture input areas, and the operation information converting unit may convert the operation information corresponding to the receivable gesture operation into operation information prior to adjustment of the size and/or the display position only when the receivable gesture operation is executed.

(14) According to one or more embodiments, a range for receiving gesture input may be set in excess of the corresponding gesture input area when the shape of the gesture input area is different from a screen shape of the display unit by a predetermined amount or larger.

(15) According to one or more embodiments, when a plurality of gesture input areas exists, the display control unit may switch a display mode of the area selection screen between a mode where all the gesture input areas are displayed on the same screen of the display unit, and a mode where a designated gesture input area is selectively displayed, based on conditions set beforehand.

(16) A non-transitory recording medium storing a computer readable image processing linkage program, according to one or more embodiments of the present invention, under the program a computer of a portable terminal device including a display unit that receives input of gesture operation executes: a connecting step that connects with an image processing apparatus which displays an operation screen receiving input of the gesture operation; a receiving step that receives, from the image processing apparatus, screen data constituting an operation screen displayed on the image processing apparatus, and information on one or a plurality of gesture input areas provided in correspondence with the screen data and receiving input of the gesture operation; a display control step that displays the operation screen of the image processing apparatus as an area selection screen shown in such a manner that a user can select any one of the gesture input areas through the area selection screen based on the screen data and the information on the gesture input area or areas received in the receiving step, and displays the corresponding gesture input area in adjusted size and/or display position on the display unit when the user selects the any one of the gesture input areas through the displayed area selection screen; an operation information converting step that converts operation information corresponding to the gesture operation into operation information prior to adjustment of the size and/or the display position when the gesture operation is input to the gesture input area displayed on the display unit; and a transmitting step that transmits the converted operation information to the image processing apparatus.

(17) According to one or more embodiments, connection with the image processing apparatus may be allowed via an information processing device that includes a display unit not receiving input of the gesture operation, and the receiving step may receive the screen data and the information on the gesture input area or areas from the information processing device having received the screen data and the information on the gesture input area or areas from the image processing apparatus, and the transmitting step may transmit the operation information to the information processing device.

(18) According to one or more embodiments, the gesture operation may include at least either operation by a single touch or operation by a multiple touch.

(19) According to one or more embodiments, the information on the gesture input area or areas may contain information on the gesture operation receivable by each of the gesture input areas, and the operation information converting step may convert the operation information corresponding to the receivable gesture operation into operation information prior to adjustment of the size and/or the display position only when the receivable gesture operation is executed.

(20) According to one or more embodiments, a range for receiving gesture input may be set in excess of the corresponding gesture input area when the shape of the gesture input area is different from a screen shape of the display unit by a predetermined amount or larger.

(21) According to one or more embodiments, when a plurality of gesture input areas exists, the display control step may switch a display mode of the area selection screen between a mode where all the gesture input areas are displayed on the same screen of the display unit, and a mode where a designated gesture input area is selectively displayed, based on conditions set beforehand.

BRIEF DESCRIPTION OF THE DRAWINGS

Advantages and features of one or more embodiments of the present invention will become more fully understood from the detailed description given hereinbelow and the appended drawings which are given by way of illustration only, and thus are not intended as a definition of the limits of the present invention, and wherein:

FIG. 7 is a view illustrating switching of a display mode an area selection screen between a mode where a plurality of gesture input areas are simultaneously displayed, and a mode where only a designated gesture input area is displayed, based on conditions set beforehand;

DETAILED DESCRIPTION OF EMBODIMENTS

Hereinafter, embodiments of an example of the present invention will be described with reference to the drawings. However, the scope of the invention is not limited to the illustrated examples.

Figure 1:
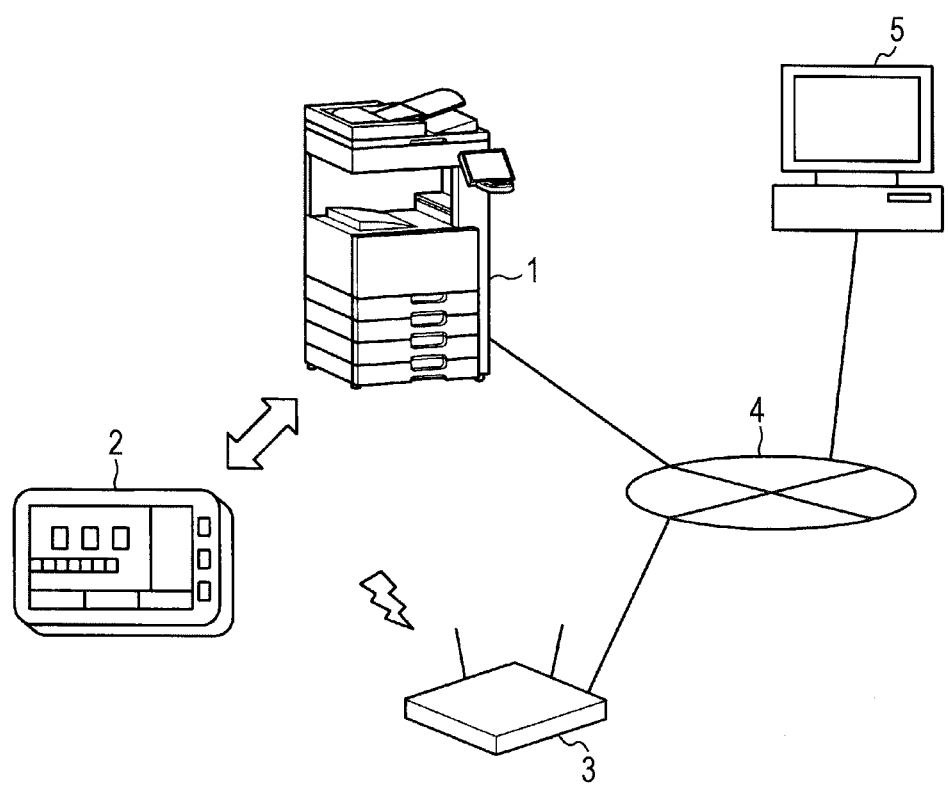
FIG. 1 is a view illustrating a configuration of an image processing linkage system according to one or more embodiments of an example of the present invention.

FIG. 1 is a view illustrating a configuration of an image processing linkage system including a portable terminal device according to one or more embodiments of an example of the present invention.

The image processing linkage system includes an image processing apparatus 1, a portable terminal device 2 constituted by a smartphone, a tablet device or the like, and others. The image processing apparatus 1 and the portable terminal device 2 are connectable with each other via a wireless LAN router 3, and a network 4. The image processing apparatus 1 and the portable terminal device 2 may be connected by wire through a USB interface or the like. However, it is assumed in one or more embodiments of the example that the image processing apparatus 1 and the portable terminal device 2 are connected with each other via wireless communication.

According to one or more embodiments of the example, the image processing apparatus 1 is constituted by an MFP of the type discussed above, which has copying function, printing function, scanning function, facsimile function and other functions. The image processing apparatus is hereinafter referred to as an MFP as well. Similarly, the portable terminal device is referred to as a portable terminal as well.

Figure 2:
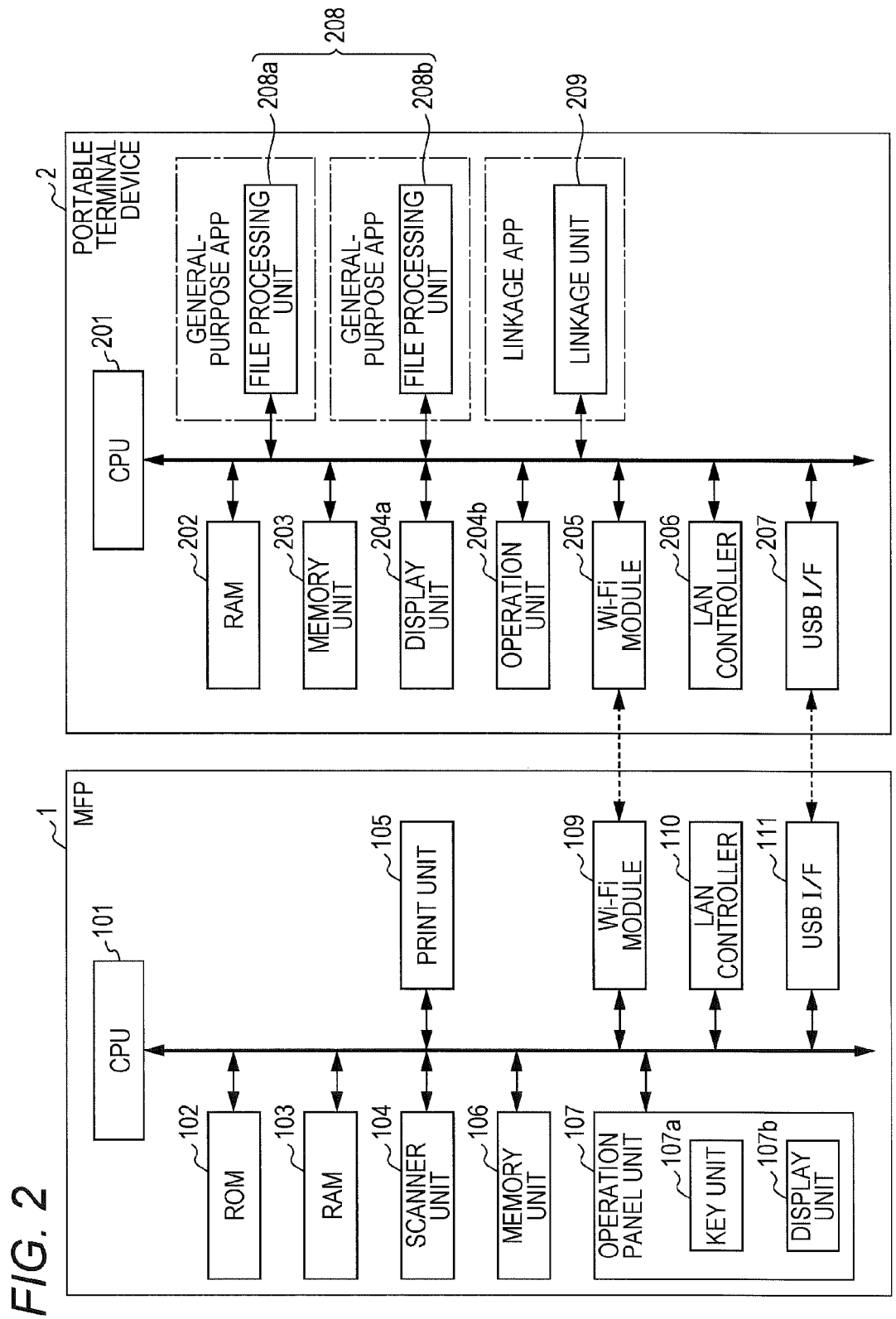
FIG. 2 is a block diagram illustrating electric configurations of an image processing apparatus and a portable terminal device.

FIG. 2 is a block diagram illustrating electric configurations of the MFP 1 and the portable terminal 2.

The MFP 1 includes a CPU 101, a ROM 102, a RAM 103, a scanner unit 104, a print unit 105, a memory unit 106, an operation panel unit 107, a WIFI (Wireless Fidelity) module 109, a LAN (Local Area Network) controller 110, a USB interface (USB I/F) 111, and other units.

The CPU 101 operating under an operation program stored in the ROM 102 or the like controls overall operation of the MFP 1. For example, the CPU 101 controls the respective functions of the MFP 1 to bring these functions into operable conditions. In addition, in response to a request issued from the portable terminal 2, the CPU 101 according to one or more embodiments of the example transmits, to the portable terminal 2, screen data constituting an operation screen of the MFP 1, i.e., a screen displayed on the portable terminal 2 side as a remote screen, and information on one or a plurality of gesture input areas to which gesture operation is input through the screen. Furthermore, the CPU 101 transmits, to the portable terminal 2, screen data and the like on an operation screen operated for execution of a job or for next display in response to operation input from a user on the portable terminal 2 side.

The ROM 102 is a memory which stores the operation program of the CPU 101, and others. The RAM 103 is a memory which provides a work area when the CPU 101 operates under the operation program.

The scanner unit 104 reads an image of a document positioned on a not-shown platen glass, or an image of a document positioned on a not-shown automatic document feeder, and outputs image data as electronic data.

The print unit 105 makes prints on a sheet based on image data read from a document by using the scanner unit 104, or print data transmitted from the portable terminal 2 or the like.

The memory unit 106 which stores various types of data, applications and others is constituted by a hard disk drive. Particularly, the memory unit 106 according to one or more embodiments of the example stores display data (screen data) on various types of operation screens to be displayed on the operation panel unit 107. According to this structure, the CPU 101 calls screen data stored in the memory unit 106 and indicating an operation screen corresponding to operation input from the user. The CPU 101 displays the called screen data on the operation panel unit 107, or transmits the called screen data to the portable terminal 2. In addition, the memory unit 106 stores information on one or a plurality of gesture input areas to which gesture operation is input through the respective screens, such as coordinate information on the gesture input areas, and types of gesture operation receivable by the respective gesture input areas. Furthermore, the memory unit 106 stores a plurality of files such as document files constituted by image data read by the scanner unit 104, and document files transmitted from an external device.

The operation panel unit 107 is used when operating the MFP 1, or when displaying a message or the like for the user. The operation panel unit 107 includes a key unit 107a containing a start key, a stop key, a reset key, numeric keys, and other mechanical hardware keys, and further includes a display unit 107b containing a touch panel for receiving touch input operation, such as a liquid crystal touch panel. Touch operation is generally achieved by gesture operation which defines operation contents based on the number of touching fingers and the shift of fingers. Examples of the gesture operation include single touch operation by touch of a single finger, and multiple touch operation by touch of a plurality of fingers. Examples of single touch operation include flick operation for drawing or scrolling a screen (page forwarding or returning), and slide operation for sliding a screen. Examples of multiple touch operation include pinch-in operation and pinch-out operation for changing magnification (expansion or reduction) of an image, rotating an image and others.

The WIFI module 109 is an interface for wireless connection with the portable terminal 2, while the LAN controller 110 is a unit for controlling communication with an external device such as a personal computer and another MFP.

The USB interface 111 is an interface for wired connection with the portable terminal 2.

The portable terminal 2 is constituted by a smartphone, a tablet device, electronic paper or the like. The portable terminal 2 includes a CPU 201, a RAM 202, a memory unit 203, a display unit 204a, an operation unit 204b, a WIFI module 205, a LAN controller 206, a USB interface 207, file processing units 208a and 208b, a linkage unit 209, and others.

The CPU 201 controls overall operation of the portable terminal 2, and operates under an OS (Operating System) corresponding to basic software, and a linkage application or a general-purpose application which will be described later.

The RAM 202 is a memory providing a work area when the CPU 201 operates under an operation program.

The memory unit 203 which stores various types of data and applications is constituted by a hard disk drive or the like. According to one or more embodiments of the example, the memory unit 203 stores remote screen display data transmitted from the MFP 1, information on gesture input areas, the basic OS, and programs such as the linkage application and the general-purpose application. In the following description, applications are abbreviated as "apps" in some cases.

The display unit 204a is constituted by a liquid crystal display or other devices. The operation unit 204b provided on the display unit 204a is constituted by a touch panel receiving touch input operation. Similarly to the case of the MFP 1, touch operation is generally achieved by gesture operation which defines operation contents based on the number of touching fingers and the shift of fingers. Examples of the gesture operation include single touch operation and multiple touch operation. Examples of the single touch operation include flick operation and slide operation, while examples of the multiple touch operation include pinch-in operation and pinch-out operation.

The WIFI module 205 is an interface for wireless connection between the portable terminal 2 and the MFP 1. The LAN controller 206 controls communication with an external device such as a user terminal. The USB interface 207 is an interface for wired connection between the portable terminal device 2 and the MFP 1.

The file processing units 208a and 208b execute processes such as file editing, file transmission, and mail distribution. The file processing units 208a and 208b are hereinafter collectively referred to as file processing units 208.

The linkage unit 209 is a unit for realizing operable conditions of the functions of the MFP 1 to achieve smooth functional linkage between the MFP 1 and the portable terminal 2. More specifically, in performing copying machine function, printing function, scanning function, facsimile function or other functions of the MFP 1, the linkage unit 209 receives, from the MFP 1, screen data for reproducing the same operation screen as the operation screen displayed on the operation panel unit 107 of the MFP 1, and displays the operation screen of the MFP 1 on the display unit 204a as a remote screen based on the received screen data. In addition, when the user presses an operation button or the like displayed on the remote screen, the linkage unit 209 detects coordinates of the corresponding operation position on the screen, and transmits the detected coordinates to the MFP 1 as operation information. The MFP 1 analyzes the received coordinates of the operation position to specify an operation request issued from the user, and executes operation corresponding to the operation request.

The functions of the file processing units 208 are performed under the general-purpose app executed by the CPU 201. In other words, the general-purpose app is software for realizing the file processing units 208 performing the function of processing various types of files. For example, the general-purpose app may be a file editing app, an app for distributing files in the form of electronic mails, app for storing files on websites, or other various types of apps.

The functions of the linkage unit 209 are performed under the foregoing linkage app executed by the CPU 201. In other words, the linkage app is software for realizing smooth functional linkage between the MFP 1 and the portable terminal 2. The linkage unit 209 also allows transmission and download of files between the linkage app and the general-purpose app.

Figure 3:
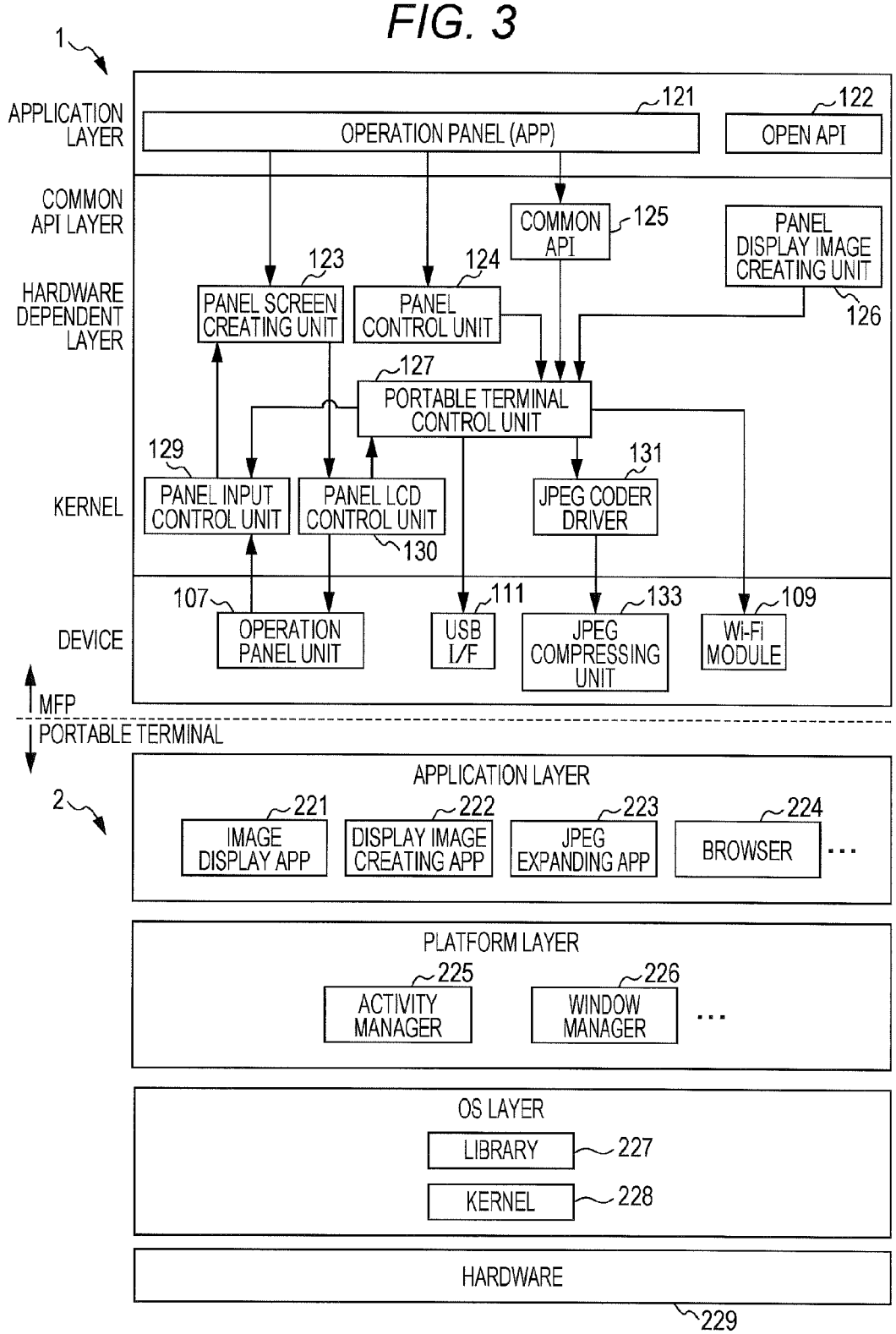
FIG. 3 is a block diagram illustrating configurations of firmware of the image processing apparatus and the portable terminal device.

FIG. 3 is a block diagram illustrating firmware configurations of the MFP 1 and the portable terminal 2.

The MFP 1 includes an operation panel (app) 121, an open API (Open Application Program Interface) 122 and others in an app layer, and further includes a common API (Common API) 125, a panel display image creating unit 126, and others in a common API layer. The MFP 1 further includes a panel screen creating unit 123, a panel control unit 124, a portable terminal control unit 127, and others in a hardware dependent layer.

In addition, the MFP 1 includes a panel input control unit 129, a panel LCD control unit 130, a JPEG coder driver 131, and others in a kernel layer. The MFP 1 further includes the operation panel unit 107, the USB interface unit 111, a JPEG compressing unit 133, the WIFI module 109, and others in a device layer.

The panel screen creating unit 123 creates MFP 1 side screen data displayed on the operation panel unit 107 when the portable terminal 2 executes linkage operation.

The panel control unit 124 controls a condition of communication with the operation panel unit 107, for example. The portable terminal control unit 127 controls an interface and the like for communication with the portable terminal 2 at the time of linkage processes executed in cooperation with the portable terminal 2.

The panel input control unit 129 performs control associated with operation input to the operation panel unit 107. The panel LCD control unit 130 performs display control of the display unit 107b of the operation panel unit 107. The JPEG compressing unit 133 executes JPEG compression of remote screen display data and the like transmitted from the portable terminal control unit 127 via the JPEG coder driver 131. The compressed data is transmitted to the portable terminal 2 via the USB interface 111 and the WIFI module 109.

On the other hand, the portable terminal 2 includes an application layer containing an image display app 221, a display image creating app 222, a JPEG expanding app 223, a browser 224, and other various types of applications, a platform layer containing various types of managers 225 and 226, an OS layer containing various types of libraries 227 and a kernel 228, and hardware 229.

The JPEG expanding app 223 expands compressed data transmitted from the MFP 1.

The display image creating app 222 displays an operation screen of the MFP 1 on the display unit 204a of the portable terminal 2 in such a manner that a gesture input area is selectable by the user. When any one of gesture input areas is selected by the user, the display image creating app 222 adjusts the size and/or display position of the selected gesture input area to the screen size of the display unit 204a, and displays the adjusted screen. This process will be detailed later.

The image display app 221 creates a remote screen corresponding to the operation screen of the MFP 1 based on the remote screen display data transmitted from the MFP 1 and expanded by the JPEG expanding app 223, and displays the created remote screen on the display unit 204a.

According to one or more embodiments of the example, the image display app 221, the display image creating app 222, the JPEG expanding app 223 constitute a part of the functions performed by the linkage app.

A process executed in linkage operation between the MFP 1 and the portable terminal 2 is hereinafter described.

The user connects the portable terminal 2 with the MFP 1 by wireless connection via a network to realize linkage operation between the portable terminal 2 and the MFP 1. The linkage operation between the portable terminal 2 and the MFP 1 begins when the user starts the linkage app installed in the portable terminal 2.

Figure 4:
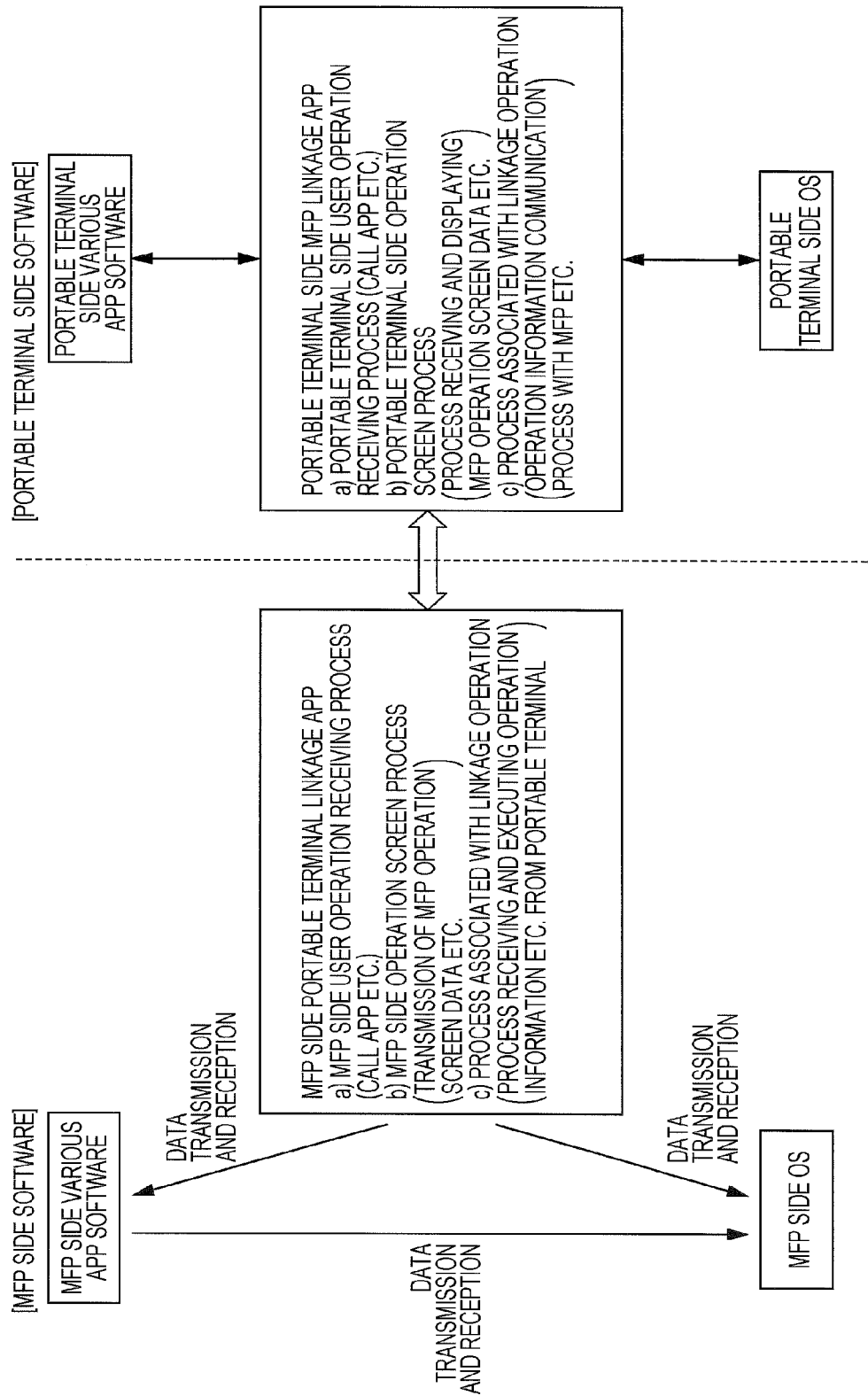
FIG. 4 is a view showing a relationship between software of the image processing apparatus and software of the portable terminal device.

FIG. 4 illustrates a relationship between software of the MFP 1 shown on the left, and software of the portable terminal 2 shown on the right.

The linkage app of the portable terminal 2 is located at an intermediate position between the OS of the portable terminal 2 and app software corresponding to the general-purpose software. The linkage app of the portable terminal 2 receives data from the MFP 1, processes received data, and acquires information on operation executed by the user and operation screen data on the portable terminal 2 side, for example. In addition, the linkage app of the portable terminal 2 transmits acquired data to the MFP 1 as necessary. Accordingly, the linkage software of the portable terminal 2 executes a user operation receiving process on the portable terminal 2 side such as calling an app, a process for receiving and displaying screen data on the operation screen of the MFP 1 (portable terminal side operation screen process), a process associated with linkage operation, and other processes. The process associated with linkage operation includes communication with the MFP 1 in handling operation information indicating contents of operation, for example.

On the other hand, the linkage app of the MFP 1 is not required to be positioned between the OS and the app software when the OS of the MFP 1 and MFP 1 app software are all self-designed or self-customized, and therefore can acquire all necessary information. In this case, the linkage app of the MFP 1 may communicate with the OS and the app software to acquire necessary information while staying independent from the OS and the app software. The linkage app of the MFP 1 executes a user operation receiving process on the MFP 1 side such as calling an app, a process for transmitting MFP side screen data to the portable terminal 2 (MFP side operation screen process), a process associated with linkage operation, and other processes. The process associated with linkage operation includes a process for receiving and executing operation information and the like received from the portable terminal 2, for example.

When the user selects a linkage operation icon displayed on the display unit 204*a* of the portable terminal 2 to issue an MFP linkage request, the linkage software of the portable terminal 2 communicates with the registered MFP 1 to call the linkage software of the MFP 1, and issues a request for acquiring screen data. In response to this request, a linkage operation mode is initiated, whereupon the MFP side operation screen is displayed on both the display unit 107*b* of the MFP 1 and the display unit 204*a* of the portable terminal 2. In this case, display of the MFP side operation screen on the display unit 107*b* of the MFP 1 may be omitted.

In response to the screen data acquisition request issued from the portable terminal 2, the MFP 1 transmits, to the portable terminal 2, screen data on the operation screen, and information on one or a plurality of gesture input areas on the screen as areas associated with the screen data, i.e., areas to which gesture operation is input when the screen data is displayed.

The information on the gesture input areas is now described with reference to FIG. 5.

Figure 5:
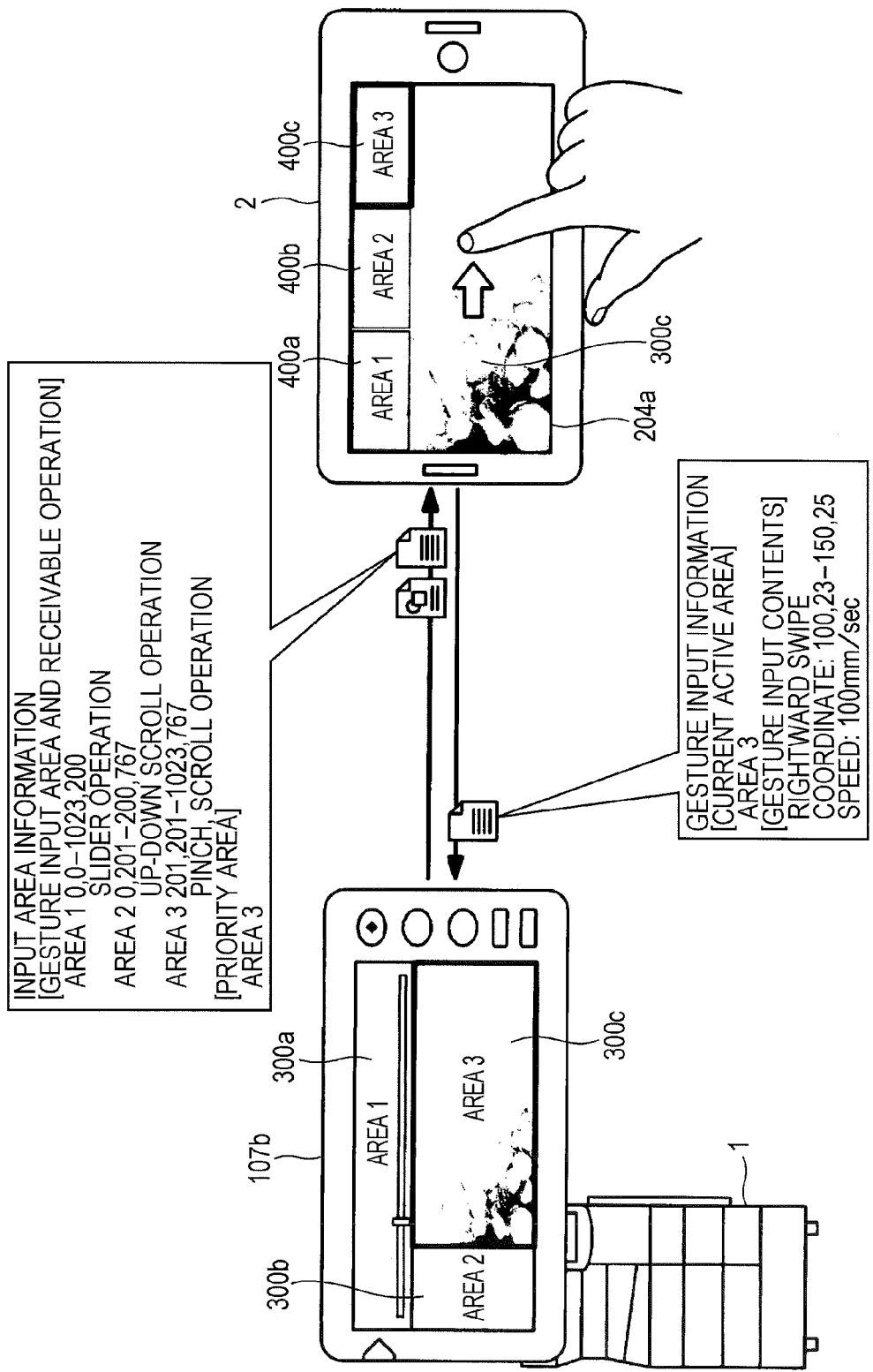
FIG. 5 is a view illustrating information on gesture input areas.

The operation screen of MFP 1 illustrated in FIG. 5 contains three gesture input areas 300*a* through 300*c*. In this example, screen data on this operation screen is transmitted to the portable terminal 2. The information on the gesture input areas 300*a* through 300*c* contains coordinate information indicating respective ranges of the gesture input areas 300*a* through 300*c*, information indicating gesture operation receivable by the respective gesture input areas 300*a* through 300*c*, and priority area information.

Figure 6:
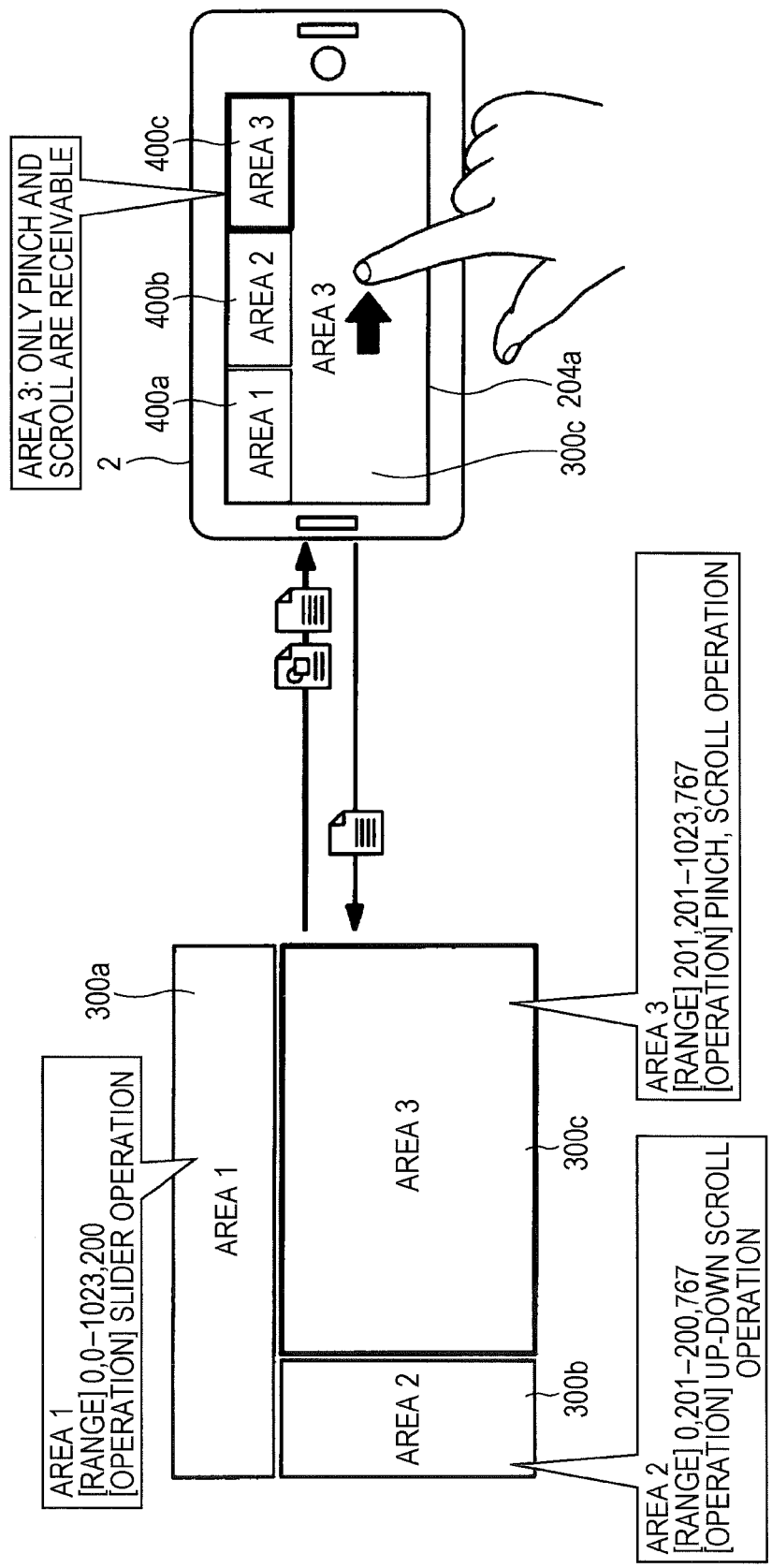
FIG. 6 is a view illustrating details of coordinate information on ranges of the respective gesture input areas, and contents of receivable gesture operation.

FIG. 6 illustrates the details of the coordinate information indicating the respective ranges of the gesture input areas 300*a* through 300*c*, and the gesture operation receivable by the respective ranges of the gesture input areas 300*a* through 300*c*. According to the settings in this example, the gesture input area 300*a* receives only slider operation. The gesture input area 300*b* receives only up-down scroll operation. The gesture input area 300*c* receives only pinch operation and scroll operation.

The priority area information is information indicating a gesture input area to be displayed with priority when a selection screen of the gesture input areas is displayed on the portable terminal 2. According to the example illustrated in FIG. 5, the gesture input area 300*c* is set to a priority area. However, the priority area is not required to be set.

When receiving the screen data and the information on the gesture input areas 300*a* through 300*c* from the MFP 1, the portable terminal 2 displays a selection screen of the gesture input areas on the display unit 204*a* based on the received data and information. As discussed above, according to the example illustrated in FIG. 5, the gesture input area 300*c* has been set to the priority area, wherefore the gesture input area 300*c* in a size adjusted to the screen size of the display unit 204*a* is displayed on the entire part of the display unit 204*a*. In addition, selection buttons 400*a* through 400*c* are displayed in an upper part of the display screen as buttons each operated by the user for selecting the corresponding one of the three gesture input areas 300*a* through 300*c*.

Figure 8:
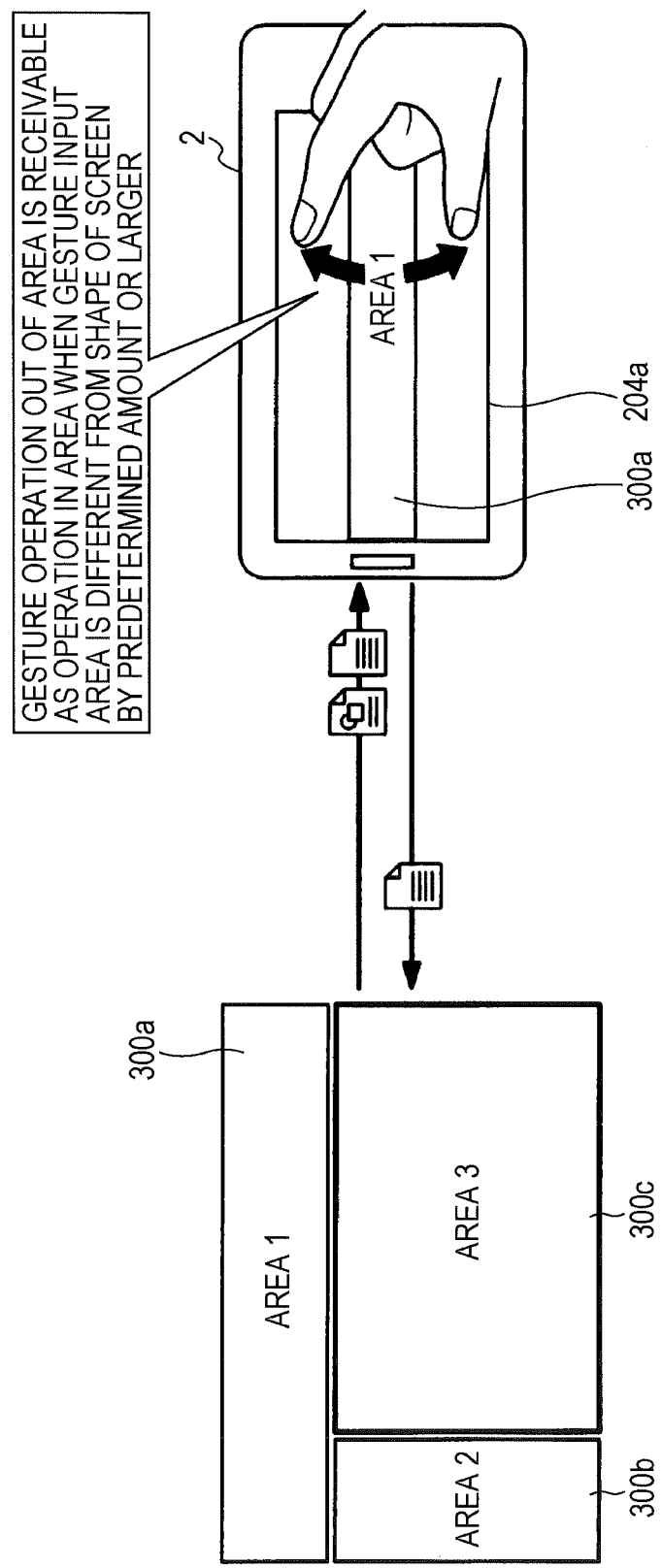
FIG. 8 is a view illustrating a process executed when the shape of a display screen of the portable terminal device is considerably different from the shape of the selected gesture input area.

When the user of the portable terminal 2 touches and selects the selection button 400*a*, for example, to select the area corresponding to desired gesture operation, the screen of the gesture input area 300*c* is switched to the screen of the gesture input area 300*a*. In this case, the gesture input area 300*a* is shifted to an easily visible position in the central area of the screen in the up-down direction, and displayed at that position as illustrated in FIG. 8, for example. In displaying the gesture input area 300*a*, the size of the screen may be changed together with the change of the display position, or without the change of the display position.

When the user touches the selection button 400*b* to select this button, the current screen is switched to the screen of the gesture input area 300*b*. While not shown in the figure, the gesture input area 300*b* in adjusted size and/or display position is displayed similarly to the case discussed above.

The user who desires to input gesture operation to the gesture input area 300*c* need not select the selection button 400*c* in the condition that the gesture input area 300*c* has been already displayed on the initial screen of the area selection screen.

The selection button corresponding to the gesture input area currently displayed may be displayed in a manner different from the display of the other selection buttons to emphasize the currently displayed gesture input area. According to the example illustrated in FIG. 5, the thick-bordered selection button 400*c* is in an emphasized display condition.

When the user executes gesture operation for the gesture input area displayed on the screen, the portable terminal 2 identifies the type of the gesture operation, and receives the gesture operation when the gesture operation is receivable. In addition, the portable terminal 2 detects specific contents for identifying the gesture operation, such as the operation direction, operation coordinates, and operation speed of the gesture operation. The portable terminal 2 converts the detected operation information into operation information corresponding to the screen of the MFP 1 prior to adjustment of the size and/or the display position, and then transmits, to the MFP 1, the converted operation information, and information on the gesture input area currently selected (active), and others as gesture input information.

The MFP 1 having received the gesture input information from the portable terminal 2 analyzes the contents of the gesture input information, and executes operation corresponding to the operation information. More specifically, when the operation corresponding to the operation information is updating the screen, the MFP 1 creates a next screen and transmits screen data of the next screen and information on the gesture input areas of the next screen to the portable terminal 2. When the operation corresponding to the operation information is a request for executing a printing job or the like, the MFP 1 issues an instruction for executing the job.

When the user ends the linkage process executed by the portable terminal 2 and linked with the MFP 1, an end request is transmitted from the portable terminal 2 to the MFP 1. As a result, the MFP 1 ends the linkage process.

As described hereinabove, the portable terminal 2 according to one or more embodiments of the example displays the operation screen of the MFP 1 on the display unit 204*a* in such a manner that the user can select any one of the gesture input areas 300*a* through 300*c* based on the screen data and the information on the gesture input areas 300*a* through 300*c* received from the MFP 1. When anyone of the gesture input areas is selected by the user, the selected gesture input area in adjusted size and/or display position is displayed on the screen.

In a conventional technology, the operation screen of the MFP 1 in a reduced screen size is displayed on the display unit 204*a* of the portable terminal 2 when the screen size of the display unit 204*a* of the portable terminal 2 is smaller than the screen size of the display unit 107*b* of the MFP 1. According to one or more embodiments of the example, however, the gesture input area selected by the user is displayed in a larger size than the conventional size, or at a shifted display position easy to receive gesture operation. In this case, the user can more easily input gesture operation to the selected area, wherefore the operability improves.

According to one or more embodiments of the example described with reference to FIG. 5, the gesture input area 300*c* is selected as a priority area, and the portable terminal 2 creates and displays an area selection screen which displays the gesture input area 300*c* with priority. However, display of the screen data containing the plurality of gesture input areas transmitted from the MFP 1 may be switched, based on conditions set beforehand, between an area selection screen where all the gesture input areas 300*a* through 300*c* are kept displayed as illustrated on the upper right side in FIG. 7, and an area selection screen where not all the gesture input areas 300*a* through 300*c* but only the gesture input area designated based on priority information or the like is displayed as illustrated on the lower right side in FIG. 7.

The conditions set beforehand in this context include the screen size of the display unit 204*a* of the portable terminal 2, the degree of sufficiency of each shape and size of the gesture input areas for gesture input, and settings input from the user, for example. When the screen size of the display unit 204*a* is a threshold set beforehand or larger, it is considered that gesture input to the respective gesture input areas is relatively easy even under the state of a simultaneous display of all the gesture input areas. In this case, all the gesture input areas are simultaneously displayed. In addition, when each shape of the gesture input areas is a shape determined beforehand, or when each size of the respective gesture input areas is a threshold determined beforehand or larger, it is also considered that gesture input to the respective gesture input areas is relatively easy. Accordingly, all the gesture input areas are simultaneously displayed.

In the case that all the gesture input areas are simultaneously displayed, the following configuration may be adopted. When any one of the gesture input area is selected by a tap or other gestures, the display screen containing all the gesture input areas may be switched to a display screen showing the corresponding gesture input area based on the determination that the corresponding gesture input area has been selected.

When the horizontal band-shaped gesture input area 300*a* is selected and displayed as illustrated in FIG. 8, there is produced such a condition that the vertical length of the gesture input area 300*a* is extremely smaller than the vertical length of the screen of the display unit 204*a* of the portable terminal 2. In this case, the shape of the gesture input area 300*a* considerably differs from the screen shape of the display unit 204*a*, wherefore only adjustment of the display position and the size is still insufficient for enhancing operability in gesture operation such as pinch operation.

Accordingly, the area for receiving gesture input on the portable terminal 2 may be enlarged to the entire area of the display unit 204*a*, for example, when the shape of the gesture input area is different from the shape of the screen of the display unit 204*a* by an amount equal to a threshold set beforehand or larger. According to this structure, the gesture operation receivable range expands, wherefore the easiness of gesture operation further improves. Needless to say, expansion of the gesture input area up to the entire screen is not required, or the setting of enlargement in this manner may be omitted.

Figure 9:
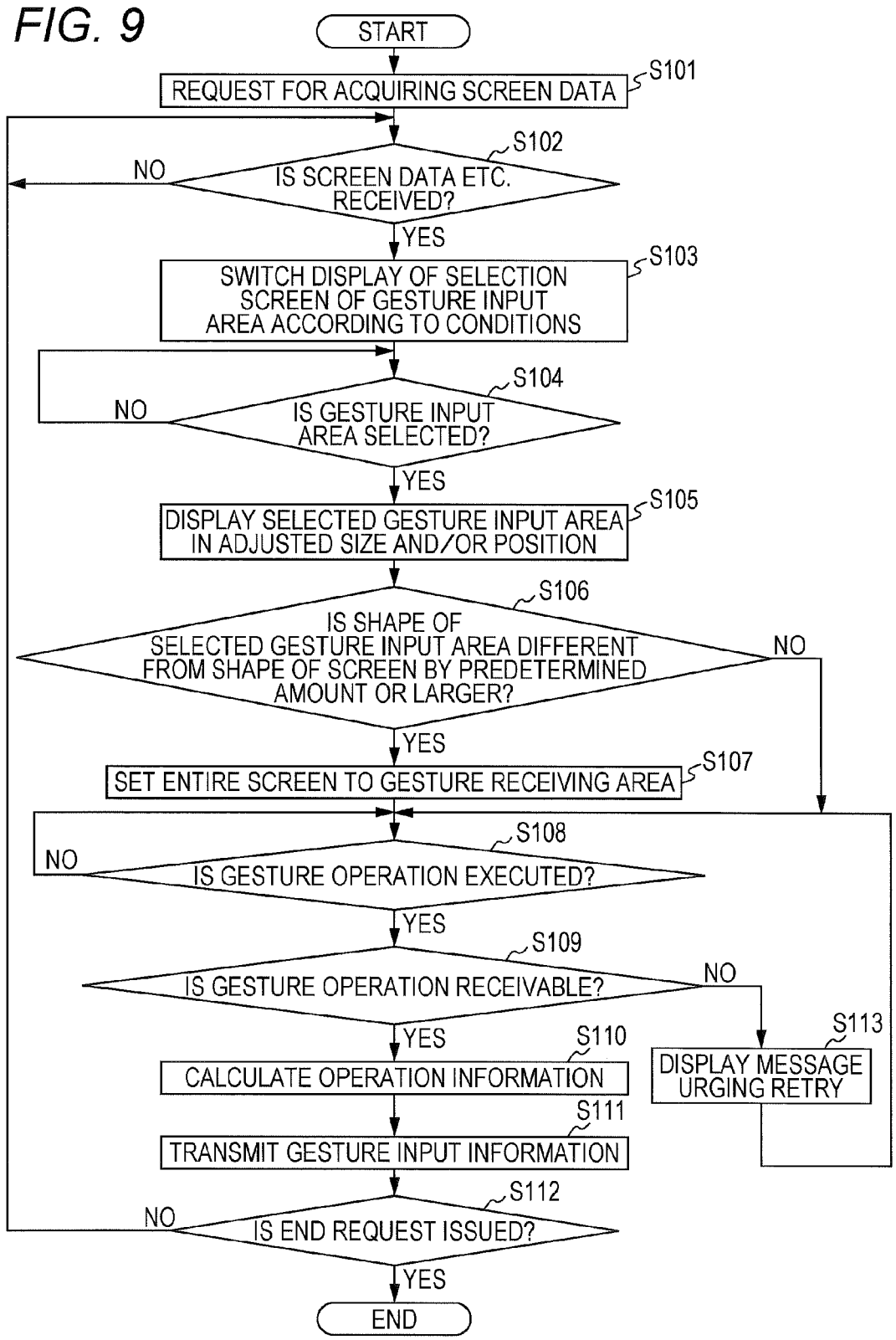
FIG. 9 is a flowchart describing operation of the portable terminal device.

FIG. 9 is a flowchart describing operation of the portable terminal 2. The operation illustrated in this flowchart is executed when the CPU 201 of the portable terminal 2 operates under the linkage app and the operation program.

In step S101, the portable terminal 2 issues a request for acquiring screen data to the MFP 1 based on operation by the user. In step S102, it is determined whether or not screen data and information on gesture input areas have been received from the MFP 1. When it is determined that the screen data and information have not been received (step S102: NO), the portable terminal 2 waits for reception of the data and information.

When it is determined that the data and information have been received (step S102: YES), an area selection screen is created and displayed based on the screen data and the information on the gesture input areas in step S103. When a plurality of gesture input areas exists, display of the area selection screen is switched, based on predetermined conditions, between the screen where all the gesture input areas are simultaneously displayed, and the screen where the gesture input area designated by priority designation or others is selectively displayed.

In step S104, the portable terminal 2 waits for selection of the gesture input area by the user. When gesture operation is executed without selection of the gesture input area, the flow shifts to step S108 to receive this gesture operation.

When it is determined that the gesture input area has been selected (step S104: YES), the selected gesture input area in adjusted size and/or display position is displayed on the display unit 204*a* in step S105.

In step S106, it is determined whether the shape of the selected gesture input area is different from the shape of the screen of the display unit 204*a* by an amount equal to a threshold set beforehand or larger. When it is determined that the difference is smaller than the threshold (step S106: NO), the flow proceeds to step S108. When it is determined that the difference is the threshold or larger (step S106: YES), the entire screen of the display unit 204a is set to an area receiving gesture input in step S107. Then, the flow proceeds to step S108.

In step S108, the portable terminal device 2 waits for completion of gesture operation (step S108: NO). When it is determined that gesture operation has been completed (step S108: YES), it is subsequently determined in step S109 whether or not the gesture operation is receivable by the selected gesture input area based on identification of the type of the gesture operation. When it is determined that the gesture operation is not receivable (step S109: NO), a message for urging retry is displayed in step S113. Then, the flow returns to step S108.

When it is determined that the gesture operation is receivable (step S109: YES), the flow proceeds to step S110. In step S110, the specific contents for identifying the gesture operation, such as the operation direction, operation coordinates, and operation speed are detected. The detected operation information is further converted into operation information corresponding to the screen of the MFP 1. In step S111, the converted operation information, the type of the gesture operation and the like are transmitted to the MFP 1 as gesture input information.

In step S112, it is checked whether or not a request for ending the linkage operation has been issued. When it is determined that this request has not been issued (step S112: NO), the flow returns to step S102 to receive next screen data and others. When it is determined that the request for ending the linkage has been issued (step S112: YES), the process ends.

Figure 10:
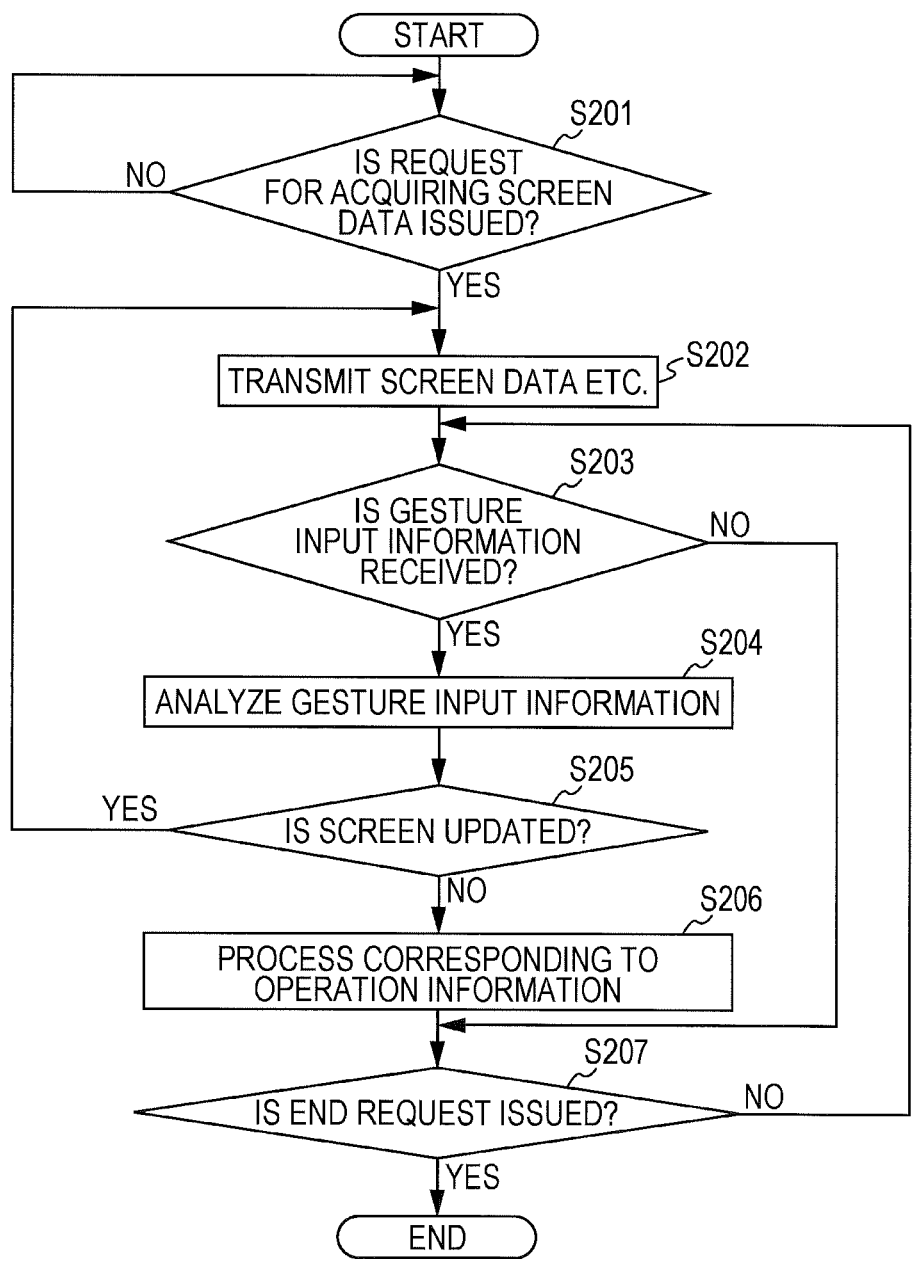
FIG. 10 is a flowchart describing operation of the image processing apparatus.

FIG. 10 is a flowchart describing operation of the MFP 1. This operation is executed based on operation of the CPU 101 of the MFP 1 under the operation program.

In step S201, the MFP 1 waits for reception of a request issued from the portable terminal 2 for acquiring screen data from the MFP 1 (step S201: NO). When the request for acquiring screen data is received (step S201: YES), screen data and information on gesture input areas are transmitted to the portable terminal 2 in step S202.

In step S203, it is checked whether or not gesture input information has been received from the portable terminal 2. When it is determined that this information has not been received (step S203: NO), the flow proceeds to step S207. When it is determined that the information has been received (step S203: YES), the gesture input information is analyzed in step S204. In step S205, it is determined whether or not the desired operation is screen update to the next screen. When it is determined that the operation is screen update to the next screen (step S205: YES), the flow returns to step S202, where screen data and information on gesture input areas for the next screen are transmitted to the portable terminal 2.

When it is determined that the operation is not screen update to the next screen (step S205: NO), a process corresponding to the operation information, such as execution of a job, is executed in step S206. Then, the flow proceeds to step S207, where it is determined whether or not an end request has been issued. When it is determined that the end request has not been issued (step S207: NO), the flow returns to step S203. When it is determined that the end request has been issued (step S207: YES), the process ends.

Figure 11:
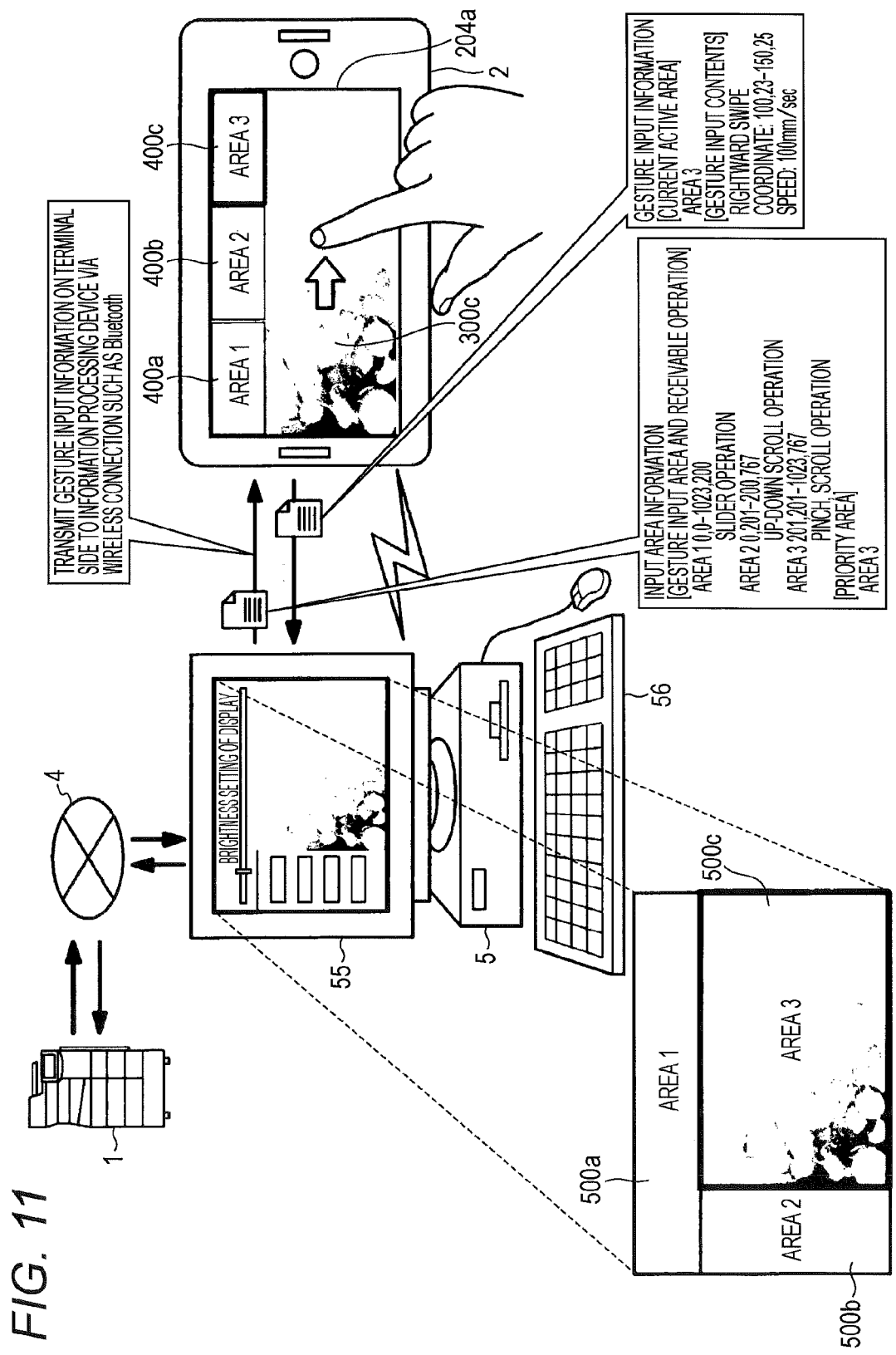
FIG. 11 is a view illustrating one or more embodiments of another example of the present invention.

FIG. 11 is a view illustrating one or more embodiments of another example of the present invention. According to one or more embodiments of the example discussed hereinbelow, an information processing device 5 constituted by a personal computer and functioning as a user terminal device is connected with the MFP 1 via the network 4. It is assumed that the information processing device 5 does not receive gesture input, and thus is assisted by the portable terminal 2 functioning as a gesture input assisting device for the information processing device 5.

More specifically, the information processing device 5 receives screen data and information on gesture input areas from the MFP 1. The screen data transmitted from the MFP 1 is displayed on a display unit 55 of the information processing device 5. The screen data contains display of three gesture input areas 500a through 500c.

The information processing device 5 and the portable terminal 2 are connected with each other by wireless connection such as Bluetooth (registered trademark). The information processing device 5 transmits the screen data and the information on gesture input areas received from the MFP 1 to the portable terminal 2 without change.

The portable terminal 2 having received the screen data and the information on gesture input areas operates in a manner similar to the operation discussed in the foregoing example with reference to FIGS. 5 through 10. Accordingly, the gesture input area selected by the user is displayed on the display unit 204a of the portable terminal 2.

When gesture operation receivable by the gesture input area displayed on the screen of the portable terminal 2 is input from the user to the corresponding gesture input area, the gesture input information is transmitted from the portable terminal 2 to the information processing device 5. The contents of the gesture input information are similar to the corresponding contents in the foregoing example discussed with reference to FIGS. 5 through 10.

The information processing device 5 having received the gesture input information transmits the received gesture input information to the MFP 1. The MFP 1 having received the gesture input information operates in a manner similar to the operation discussed with reference to FIGS. 5 through 10.

According to one or more embodiments of the example, the information processing device 5 transmits screen data and information on gesture input areas received from the MFP 1 to the portable terminal 2, and transfers gesture input information received from the portable terminal 2 to the MFP 1. Accordingly, the user can easily input gestures to the operation screen of the MFP 1 by using the portable terminal 2 even when the information processing device 5 does not have a gesture input function. In other words, the portable terminal 2 functions as a gesture input assisting device for the information processing device 5. Moreover, the operation screen of the MFP 1 is displayed on the display unit 55 of the information processing device 5, wherefore the user can input gesture operation to the screen of the portable terminal 2 while checking the operation screen displayed on the display unit 55 of the information processing device 5. Accordingly, the operability improves.

The information processing device 5 having received information on the gesture input area selected by the user as transfer from the portable terminal 2 may display the selected gesture input area in an identifiable manner different from display of the other gesture input areas on the operation screen of the MFP 1 displayed on the display unit 55. According to an example illustrated in FIG. 11, the thick-bordered gesture input area 500c is displayed in a different manner.

Figure 12:
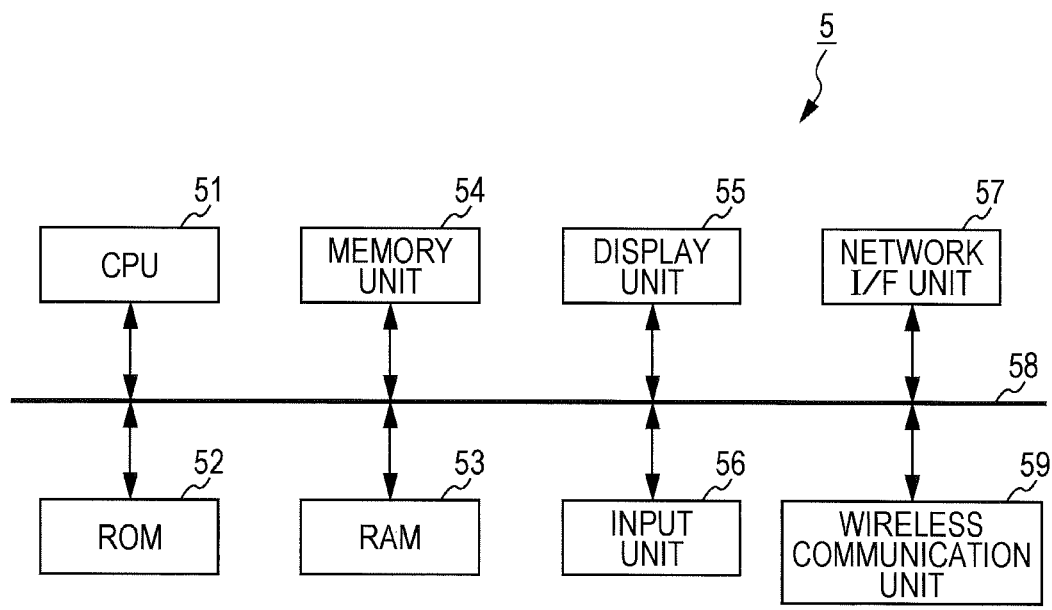
FIG. 12 is a block diagram illustrating a configuration of an information processing device.

FIG. 12 is a block diagram illustrating a system configuration of the information processing device 5.

The information processing device 5 includes a CPU 51, a ROM 52, a RAM 53, a memory unit 54, the display unit 55, an input unit 56, a network interface unit (network I/F unit) 57, a wireless communication unit 59 and others. These units are connected with each other via a system bus 58.

The CPU 51 executes programs stored in the ROM 52, the memory unit 54 and the like to control the general operation of the information processing device 5. The ROM 52 is a storage medium which stores programs executed by the CPU 51, and other data.

The RAM 53 is a storage medium which provides a work area when the CPU 51 operates under an operation program. The memory unit 54 is constituted by a storage medium such as a hard disk, and stores various types of data, application programs and others. The display unit 55 is constituted by a liquid crystal display device or the like, and displays the operation screen of the MFP 1, various types of messages, an input receiving screen, a selection screen and the like operated by the user, for example.

The input unit 56 is a unit operated by the user for input operation, and constituted by a keyboard, a mouse and others. The network interface unit 57 functions as a communication unit for realizing transmission and reception of data to and from the MFP 1 via the network 4. The wireless communication unit 59 achieves wireless communication with the portable terminal 2.

Figure 13:
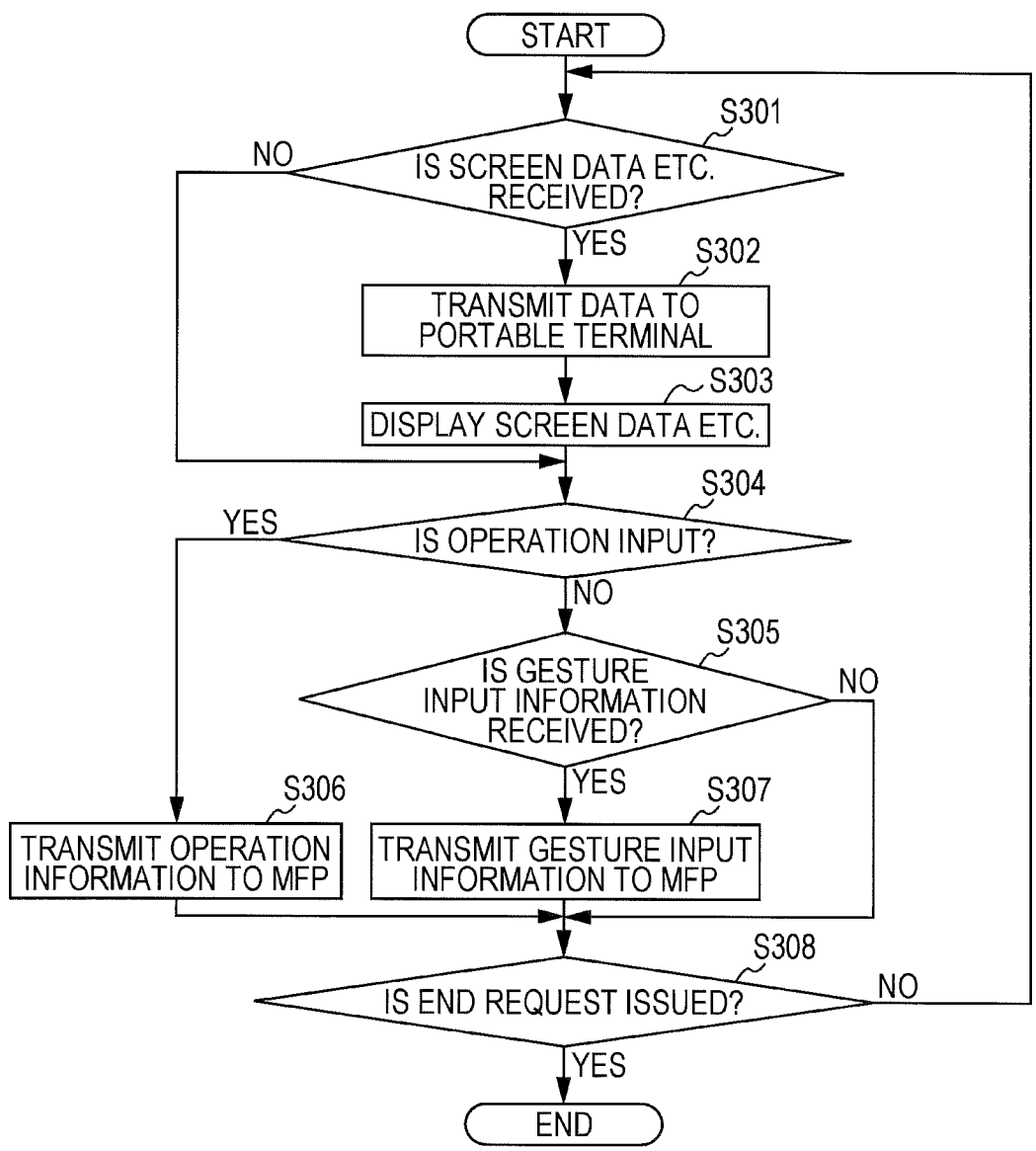
FIG. 13 is a flowchart describing operation of the information processing device.

FIG. 13 is a flowchart describing operation of the information processing device 5 according to one or more embodiments of the example discussed with reference to FIG. 11.

In step S301, it is determined whether or not screen data and information on gesture input areas have been received from the MFP 1. When it is determined that the data and information have not been received (step S301: NO), the flow proceeds to step S304. When it is determined that the data and information have been received (step S301: YES), the received data and the like are transmitted to the portable terminal 2 in step S302. In step S303, the screen data received from the MFP 1 is displayed on the display unit 55. Then, the flow proceeds to step S304.

In step S304, it is determined whether or not user operation has been input to the input unit 56 or others of the information processing device 5. When it is determined that user operation has been input (step S304: YES), operation information is transmitted to the MFP 1 in step S306. Then, the flow proceeds to step S308. When it is determined that user operation has not been input (step S304: NO), it is subsequently determined whether or not gesture input information has been received from the portable terminal 2 in step S305. When it is determined that gesture input information has been received (step S305: YES), the gesture input information is transmitted to the MFP 1 in step S307. Then, the flow proceeds to step S308. When it is determined that gesture input information has not been received (step S305: NO), the flow proceeds to step S308.

In step S308, it is determined whether or not an end request has been issued. When it is determined that an end request has not been issued (step S308: NO), the flow proceeds to step S301. When it is determined that an end request has been issued (step S308: YES), the process ends.

According to one or more embodiments of an example of the present invention, screen data constituting the operation screen displayed on the display unit of the image processing apparatus, and information on one or a plurality of gesture input areas provided in correspondence with the screen data and receiving input of gesture operation through the screen are transmitted to the portable terminal device. On the other hand, the portable terminal device displays the operation screen of the image processing apparatus on the display unit of the portable terminal device in such a manner that a user can select any one of the gesture input areas through the screen based on the received screen data and information on the gesture input area or areas. When any one of the gesture input areas is selected by the user, the selected gesture input area in adjusted size and/or display position is displayed on the display unit of the portable terminal device.

The gesture input area selected by the user is displayed in a larger area than in a conventional gesture input area, or is displayed at a shifted display position to which gesture operation is easily input. Accordingly, gesture operation is easily input from the user to the selected area, wherefore the operability improves.

When gesture operation is input to the displayed gesture input area, operation information corresponding to the gesture operation is converted into operation information prior to adjustment of the size and/or display position, and transmitted to the image processing apparatus. The image processing apparatus having received the operation information executes processes corresponding to the operation information, and further executes processes for update to the next screen, execution of a job, and others.

According to one or more embodiments of an example of the present invention, the screen data, the information on the gesture input area or areas, the operation information and others are transmitted and received between the portable terminal device, and the information processing device which includes the display unit not receiving input of gesture operation. In this case, the portable terminal device functions as an assisting device which inputs gesture operation to the information processing device not receiving input of gesture operation.

According to one or more embodiments of an example of the present invention, at least either operation by a single touch or operation by a multiple touch is receivable as gesture operation.

According to one or more embodiments of an example of the present invention, only receivable gesture operation is received when receivable gesture operation is determined for each of the gesture input areas. After reception of the receivable gesture operation, operation information corresponding to the received gesture operation is converted into operation information prior to adjustment of the size and/or the display position, and transmitted to the image processing apparatus.

According to one or more embodiments of an example of the present invention, the range for receiving gesture input increases in excess of the corresponding gesture input area when the shape of the selected gesture input area is different from the screen shape of the display unit of the portable terminal device by the predetermined amount or larger. Accordingly, gesture operation is more easily input.

According to one or more embodiments of an example of the present invention, the display mode of the area selection screen is switched between the mode where all the plurality of gesture input areas are simultaneously displayed on the display unit, and the mode where a designated gesture input area is selectively displayed, based on conditions set beforehand, such as the screen size of the display unit of the portable terminal device. Accordingly, the area selection screen is displayed appropriately for situations.

According to one or more embodiments of an example of the present invention, the operation screen of the image processing apparatus is displayed on the display unit of the information processing device based on the screen data received from the image processing apparatus. Accordingly, the user can operate the portable terminal device while viewing the operation screen displayed on the display unit of the information processing device.

According to one or more embodiments of an example of the present invention, the gesture input area selected by the user through the operation screen of the image processing apparatus on the portable terminal side is displayed on the display unit of the information processing device in an identifiable manner different from the other gesture input areas. Accordingly, the selected gesture input area can be checked on the screen of the information processing device.

According to one or more embodiments of an example of the present invention, the corresponding selected gesture input area in adjusted size and/or display position is displayed when any one of the gesture input areas is selected by the user as an area to which gesture operation is desired to be input. Accordingly, the user easily input gesture operation to the selected area, wherefore the operability improves.

According to one or more embodiments of an example of the present invention, the portable terminal device displays the corresponding selected gesture input area in adjusted size and/or display position when any one of the gesture input areas is selected by the user as an area to which gesture operation is desired to be input. Accordingly, the user easily input gesture operation to the selected area.

According to one or more embodiments of an example of the present invention, the portable terminal device functions as an assisting device which inputs gesture operation to the information processing device not receiving input of gesture operation.

According to one or more embodiments of an example of the present invention, at least either operation by a single touch or operation by a multiple touch is receivable as gesture operation.

According to one or more embodiments of an example of the present invention, only receivable gesture operation is received when receivable gesture operation is determined for each of the gesture input areas.

According to one or more embodiments of an example of the present invention, the range for receiving gesture input increases in excess of the corresponding gesture input area when the shape of the selected gesture input area is different from the screen shape of the display unit by the predetermined amount or larger. Accordingly, gesture operation is more easily input.

According to one or more embodiments of an example of the present invention, the display mode of the area selection screen is switched between the mode where all the plurality of gesture input areas are simultaneously displayed on the display unit, and the mode where only a designated gesture input area is selectively displayed, based on conditions set beforehand, such as the screen size of the display unit of the portable terminal device. Accordingly, the area selection screen is displayed appropriately for situations.

According to one or more embodiments of an example of the present invention, the computer of the portable terminal device executes processes for displaying the selected gesture input area in adjusted size and/or display position when any one of the gesture input areas is selected by the user as an area to which gesture operation is desired to be input.

Although one or more embodiments of the present invention has been described and illustrated in detail, it is clearly understood that the same is by way of illustrated and example only and is not to be taken by way of limitation, the scope of the present invention being interpreted by terms of the appended claims.

What is claimed is:

1. An image processing linkage system comprising:
an image processing apparatus (IPA) and a portable terminal device (PTD) connectable with each other, wherein
the image processing apparatus includes
an IPA touch panel that receives input of an IPA gesture operation, and
an IPA transmitter that transmits, to the portable terminal device, screen data constituting an operation screen displayed on the IPA touch panel, and information on one or a plurality of gesture input areas associated with the screen data,
the portable terminal device includes
a PTD touch panel that receives input of a PTD gesture operation,
a receiver that receives the screen data and the information on the gesture input area or areas,
a central processing unit (CPU) that
displays the operation screen of the image processing apparatus as an area selection screen that includes each of the gesture input areas as selection buttons based on the screen data and the information on the gesture input area or areas received from the receiver, and displays the gesture input area corresponding to the selection button selected by a user through the displayed area screen in adjusted size and/or display position with the same selection buttons on the PTD touch panel, and
converts operation information corresponding to the PTD gesture operation into operation information prior to adjustment of the size and/or the display position when the PTD gesture operation is input to the gesture input area displayed on the PTD touch panel, and
a PTD transmitter that transmits the converted operation information to the image processing apparatus, and
the image processing apparatus receives the operation information transmitted from the portable terminal device, and executes a process corresponding to the operation information.

2. The image processing linkage system according to claim 1, wherein
the image processing apparatus and the portable terminal device are connectable with each other via an information processing device (IPD) that includes an IPD display not receiving input of the PTD gesture operation, and
the information processing device (IPD) receives the screen data and the information on the gesture input area or areas from the image processing apparatus and transfers the received screen data and information to the portable terminal device, and receives the operation information from the portable terminal device and transfers the received operation information to the image processing apparatus.

3. The image processing linkage system according to claim 1, wherein the PTD gesture operation includes at least either operation by a single touch or operation by a multiple touch.

4. The image processing linkage system according to claim 1, wherein
the information on the gesture input area or areas contains information on the PTD gesture operation receivable by each of the gesture input areas (receivable gesture operation), and the CPU of the portable terminal device converts the operation information corresponding to the receivable gesture operation into operation information prior to adjustment of the size and/or the display position only when the receivable gesture operation is executed.

5. The image processing linkage system according to claim 1, wherein the portable terminal device sets a range for receiving gesture input in excess of the gesture input area when the shape of the gesture input area is different from a screen shape of the PTD touch panel by a predetermined amount or larger.

6. The image processing linkage system according to claim 1, wherein, when a plurality of gesture input areas exists, the CPU of the portable terminal device switches a display mode of the area selection screen between a mode where all the gesture input areas are displayed on the same screen of the PTD touch panel, and a mode where a designated gesture input area is selectively displayed, based on conditions set beforehand.

7. The image processing linkage system according to claim 2, wherein the operation screen of the image processing apparatus is displayed on the IPD display based on the screen data transmitted from the image processing apparatus.

8. The image processing linkage system according to claim 7, wherein the gesture input area selected by the user on the portable terminal device side is displayed on the IPD display in an identifiable manner different from the other gesture input areas on the operation screen of the image processing apparatus.

9. An image processing linkage method executed by an image processing linkage system including an image processing apparatus (IPA) and a portable terminal device (PTD) connectable with each other, the method comprising:
  transmitting, from the image processing apparatus to the portable terminal device, screen data constituting an operation screen displayed on an IPA touch panel and receiving input of a PTD gesture operation, and information on one or a plurality of gesture input areas on a screen as area or areas associated with the screen data;
  receiving, with the portable terminal device, the screen data and the information on the gesture input area or areas;
  displaying, on the portable terminal device, the operation screen of the image processing apparatus as an area selection screen that includes each of the gesture input areas as selection buttons based on the screen data and the information on the gesture input area or areas received, and displays the gesture input area corresponding to the selection button selected by a user through the displayed area screen in adjusted size and/or display position with the same selection buttons on a PTD touch panel;
  converting, with the portable terminal device, operation information corresponding to the PTD gesture operation into operation information of the screen prior to adjustment of the size and/or the display position when the PTD gesture operation is input to the gesture input area displayed on the PTD touch panel;
  transmitting, from the portable terminal device, the converted operation information to the image processing apparatus; and
  receiving, with the image processing apparatus, the operation information transmitted from the portable terminal device, and executing, with the image processing apparatus, a process corresponding to the operation information.

10. A portable terminal device (PTD) comprising:
  a connector that connects with an image processing apparatus which displays an operation screen receiving input of a PTD gesture operation;
  a PTD touch panel that receives input of the PTD gesture operation,
  receiver that receives screen data constituting an operation screen displayed on the image processing apparatus, and information on one or a plurality of gesture input areas associated with the screen data;
  central processing unit (CPU) that
    displays the operation screen of the image processing apparatus as an area selection screen that includes each of the gesture input areas as selection buttons based on the screen data and the information on the gesture input area or areas received from the receiver, and displays the gesture input area corresponding to the selection button selected by a user through the displayed area screen in adjusted size and/or display position with the same selection buttons on the touch; and
    converts operation information corresponding to the PTD gesture operation into operation information prior to adjustment of the size and/or the display position when the PTD gesture operation is input to the gesture input area displayed on the PTD touch panel; and
  a PTD transmitter that transmits the converted operation information to the image processing apparatus.

11. The portable terminal device according to claim 10, wherein
  the portable terminal device is connectable with the image processing apparatus via an information processing device (IPD) that includes an IPD display not receiving input of the PTD gesture operation,
  the receiver receives the screen data and the information on the gesture input area or areas from the information processing device having received the screen data and the information on the gesture input area or areas from the image processing apparatus, and
  the PTD transmitter transmits the operation information to the information processing device.

12. The portable terminal device according to claim 10, wherein the PTD gesture operation includes at least either operation by a single touch or operation by a multiple touch.

13. The portable terminal device according to claim 10, wherein
  the information on the gesture input area or areas contains information on the PTD gesture operation receivable by each of the gesture input areas (receivable gesture operation), and
  the CPU converts the operation information corresponding to the receivable gesture operation into operation information prior to adjustment of the size and/or the display position only when the receivable gesture operation is executed.

14. The portable terminal device according to claim 10, wherein a range for receiving gesture input is set in excess of the gesture input area when the shape of the gesture input area is different from a screen shape of the PTD touch panel by a predetermined amount or larger.

15. The portable terminal device according to claim 10, wherein, when a plurality of gesture input areas exists, the CPU switches a display mode of the area selection screen between a mode where all the gesture input areas are displayed on the same screen of the PTD touch panel, and a mode where a designated gesture input area is selectively displayed, based on conditions set beforehand.

16. A non-transitory recording medium storing a computer readable image processing linkage program, the program causing a portable terminal device (PTD) including a PTD touch panel that receives input of a PTD gesture operation to:
- connect with an image processing apparatus that displays an operation screen receiving input of the PTD gesture operation;
- receive, from the image processing apparatus, screen data constituting an operation screen displayed on the image processing apparatus, and information on one or a plurality of gesture input areas associated with the screen data;
- display the operation screen of the image processing apparatus as an area selection screen that includes each of the gesture input areas as selection buttons based on the screen data and the information on the gesture input area or areas received, and display the gesture input area corresponding to the selection button selected by a user through the displayed area screen in adjusted size and/or display position with the same selection buttons on the PTD touch panel;
- convert operation information corresponding to the PTD gesture operation into operation information prior to adjustment of the size and/or the display position when the PTD gesture operation is input to the gesture input area displayed on the PTD touch panel; and
- transmit the converted operation information to the image processing apparatus.

17. The non-transitory recording medium storing a computer readable image processing linkage program according to claim 16, wherein
connection with the image processing apparatus is allowed via an information processing device (IPD) that includes an IPD display not receiving input of the PTD gesture operation,
the program causes the portable terminal device to receive the screen data and the information on the gesture input area or areas from the information processing device having received the screen data and the information on the gesture input area or areas from the image processing apparatus, and
the program causes the portable terminal device to transmit the operation information to the information processing device.

18. The non-transitory recording medium storing a computer readable image processing linkage program according to claim 16, wherein the PTD gesture operation includes at least either operation by a single touch or operation by a multiple touch.

19. The non-transitory recording medium storing a computer readable image processing linkage program according to claim 16, wherein
the information on the gesture input area or areas contains information on the PTD gesture operation receivable by each of the gesture input areas (receivable gesture operation), and
the program causes the portable terminal device to convert the operation information corresponding to the receivable gesture operation into operation information prior to adjustment of the size and/or the display position only when the receivable gesture operation is executed.

20. The non-transitory recording medium storing a computer readable image processing linkage program according to claim 16, wherein a range for receiving gesture input is set in excess of the gesture input area when the shape of the gesture input area is different from a screen shape of the PTD touch panel by a predetermined amount or larger.

21. The non-transitory recording medium storing a computer readable image processing linkage program according to claim 16, wherein, when a plurality of gesture input areas exists, the program causes the portable terminal device to switch a display mode of the area selection screen between a mode where all the gesture input areas are displayed on the same screen of the PTD touch panel, and a mode where a designated gesture input area is selectively displayed, based on conditions set beforehand.

* * * * *